Nov. 13, 1962     C. H. ARNOLD     3,063,653
HOISTING DEVICE
Filed Dec. 29, 1958     6 Sheets-Sheet 1
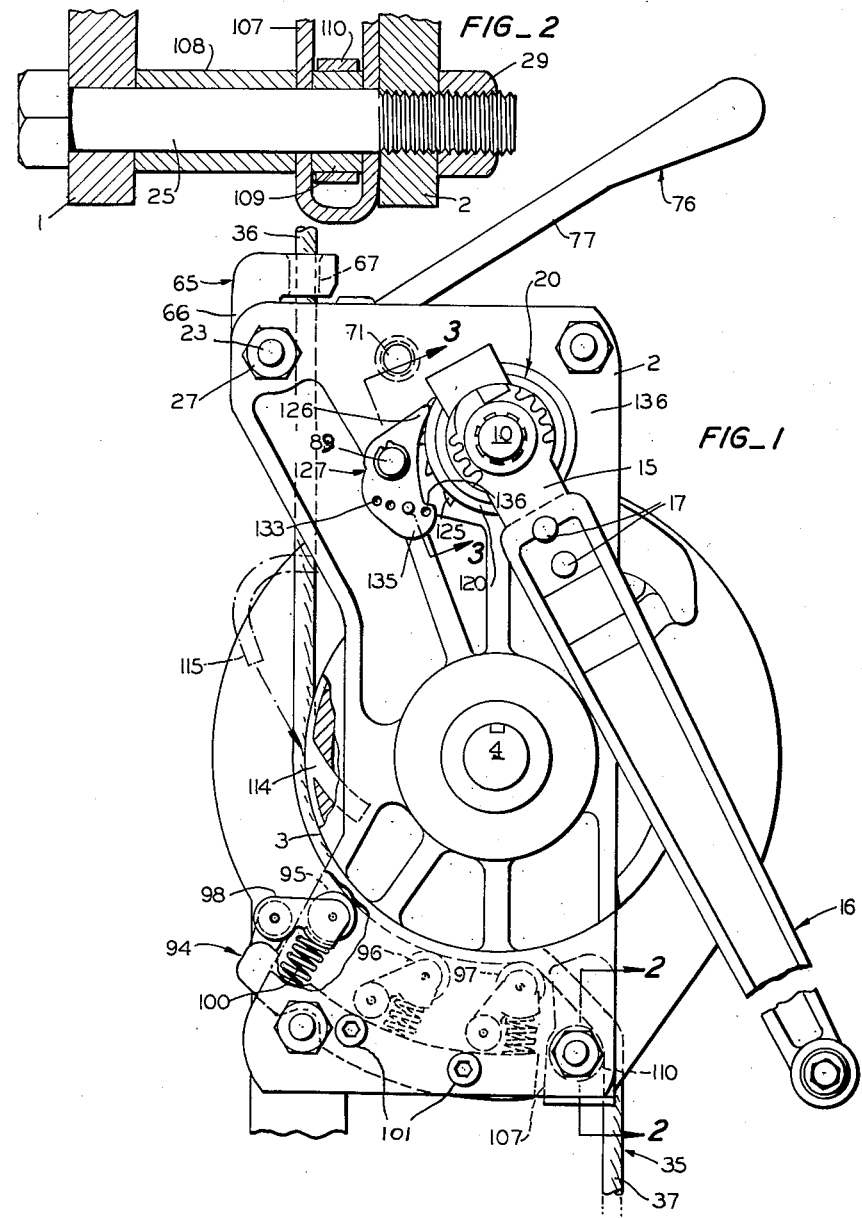
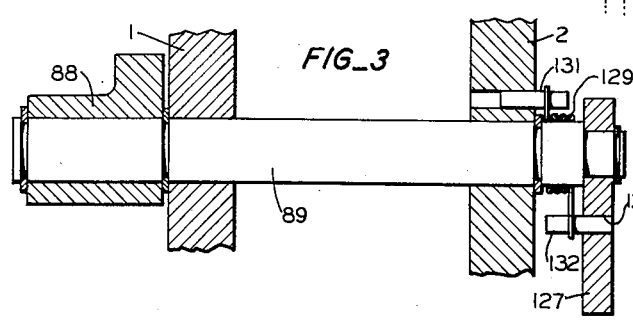
INVENTOR.
CARTER H. ARNOLD
BY
Berryman, Mahler & Wood
ATTORNEYS Nov. 13, 1962     C. H. ARNOLD     3,063,653
HOISTING DEVICE
Filed Dec. 29, 1958     6 Sheets-Sheet 2
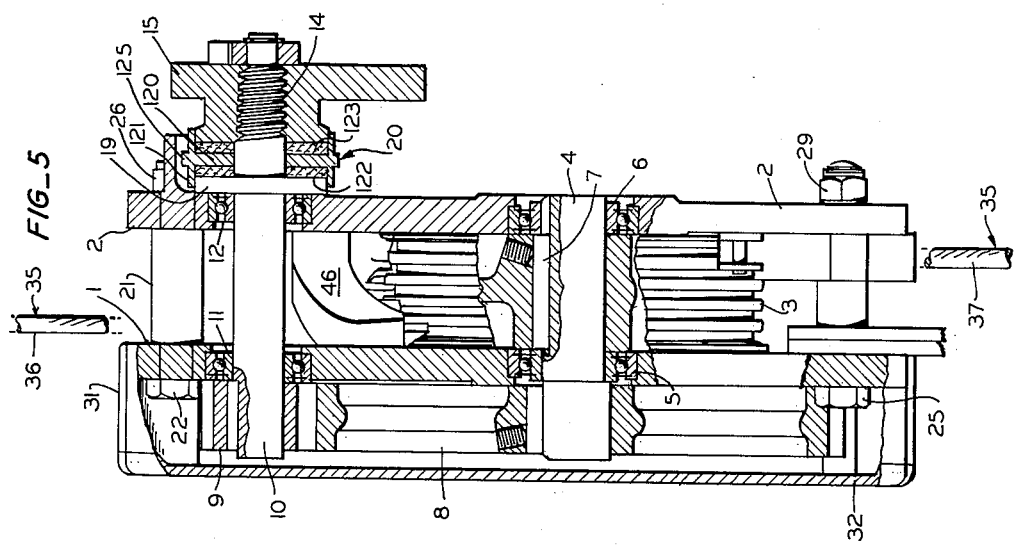
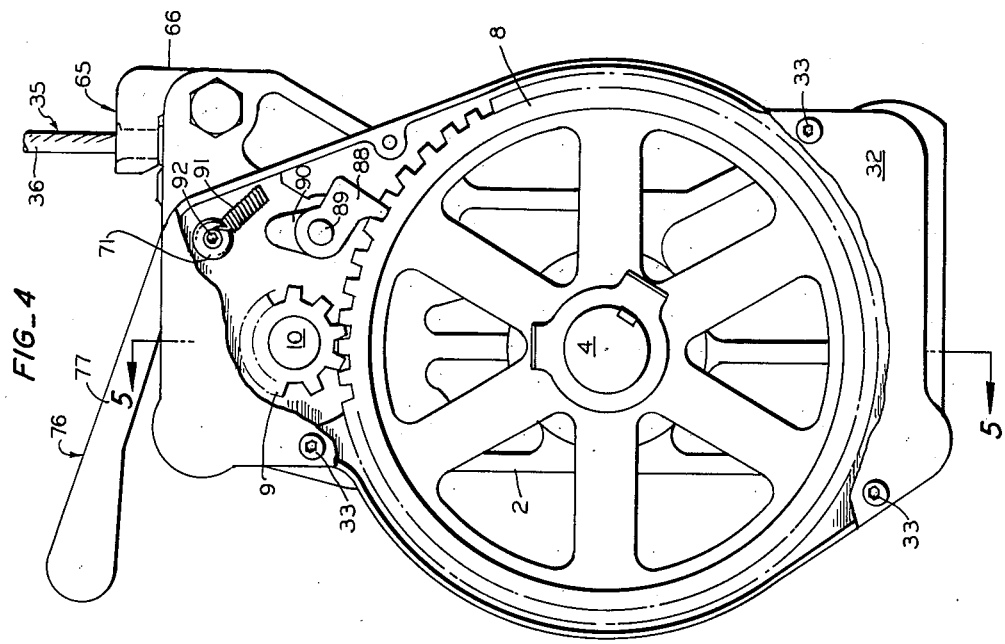
INVENTOR
CARTER H. ARNOLD
BY
ATTORNEYS Nov. 13, 1962    C. H. ARNOLD    3,063,653
HOISTING DEVICE
Filed Dec. 29, 1958    6 Sheets-Sheet 3
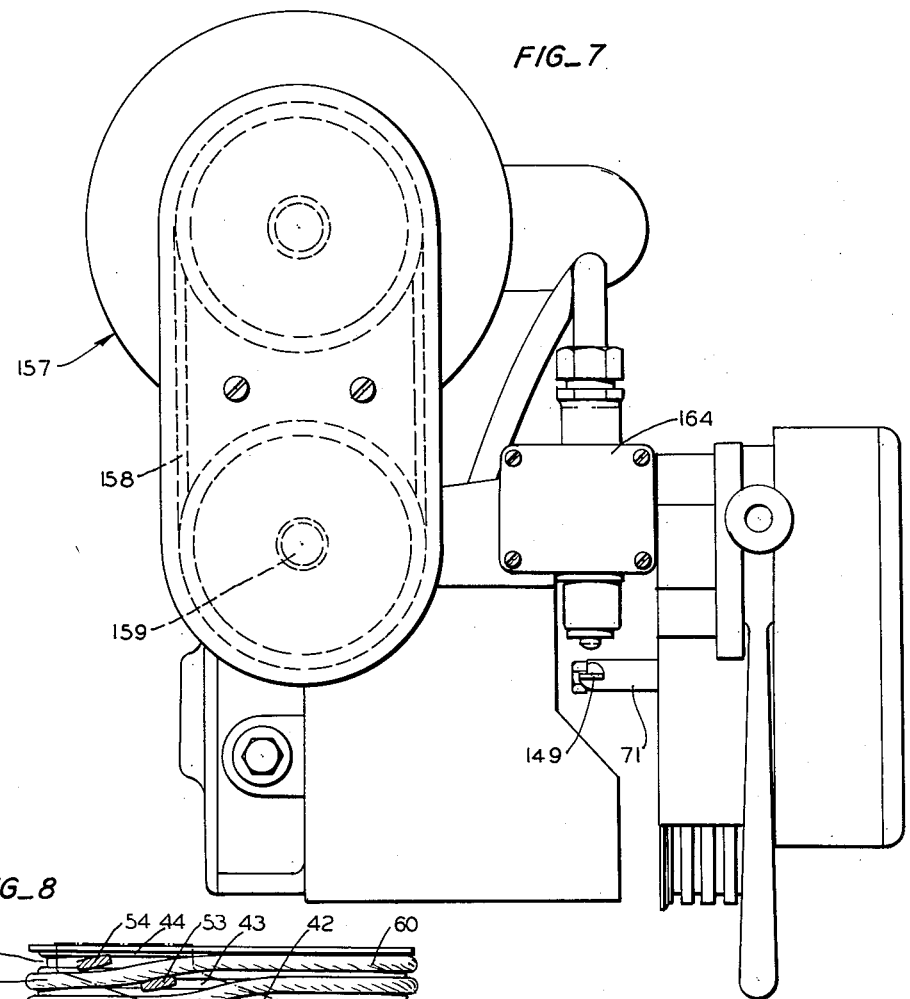
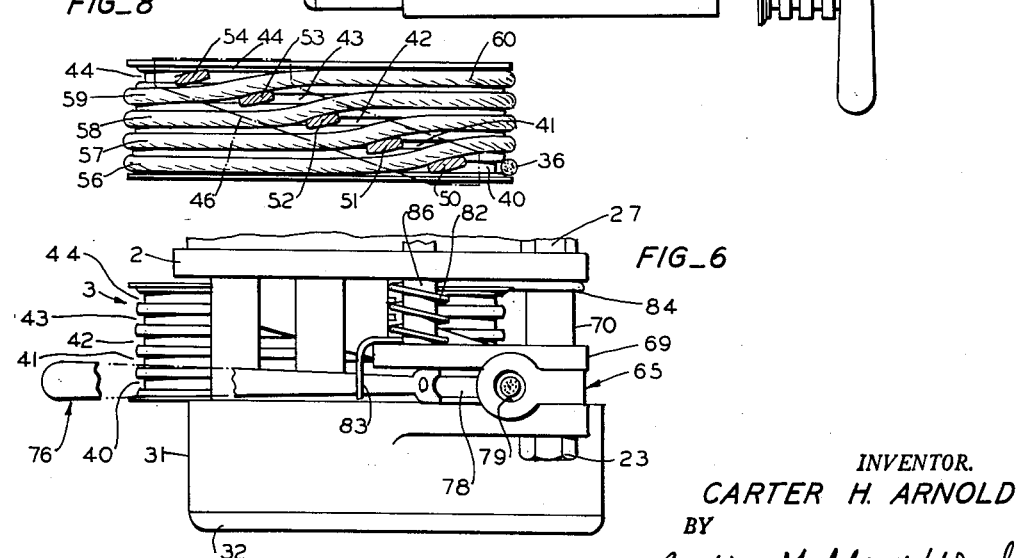
INVENTOR.
CARTER H. ARNOLD
BY
Baykey, Mohler & Wood
ATTORNEYS Nov. 13, 1962
C. H. ARNOLD
3,063,653
HOISTING DEVICE
Filed Dec. 29, 1958
6 Sheets-Sheet 4
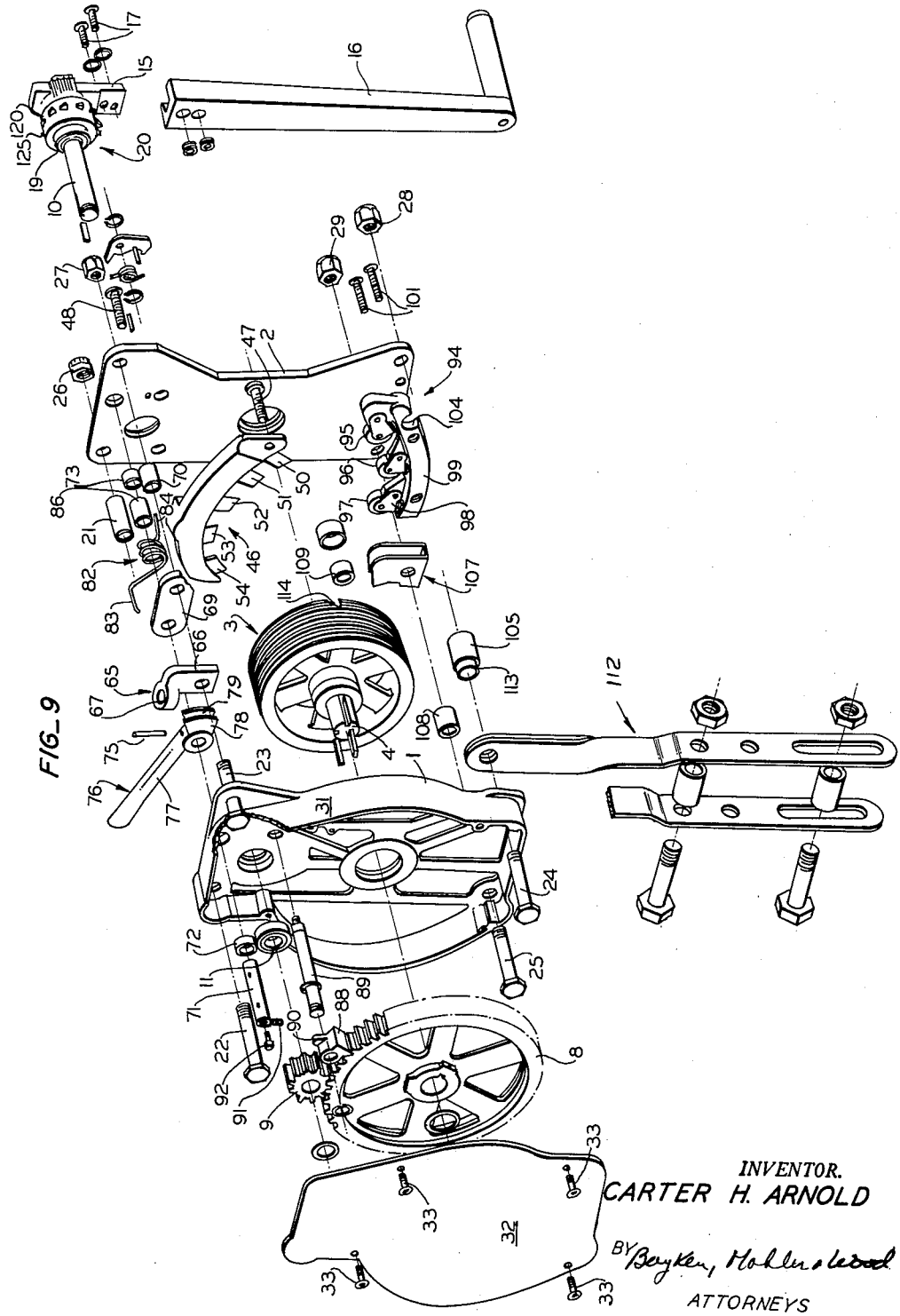
FIG_9
INVENTOR.
CARTER H. ARNOLD
BY Boyken, Mohler & Leed
ATTORNEYS

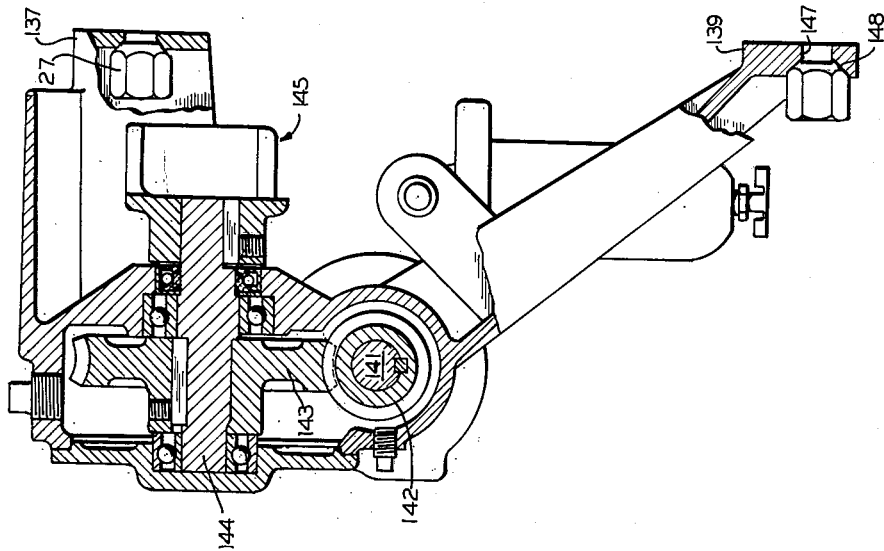
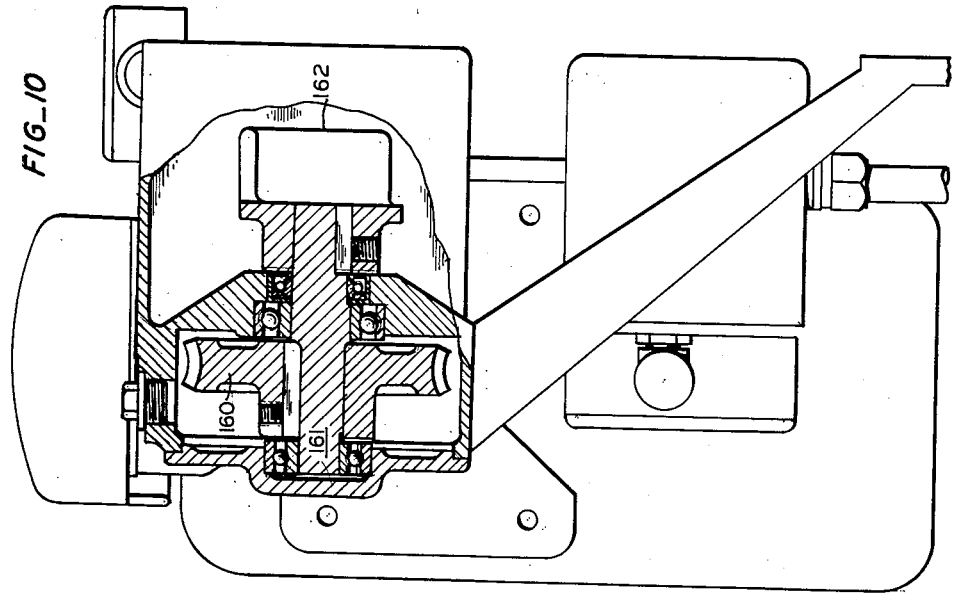

Nov. 13, 1962   C. H. ARNOLD   3,063,653
HOISTING DEVICE
Filed Dec. 29, 1958   6 Sheets-Sheet 6
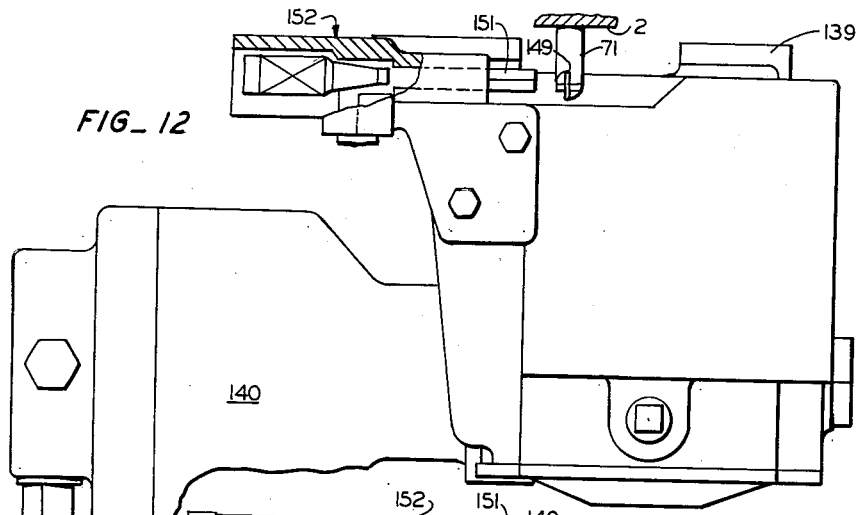
FIG_12
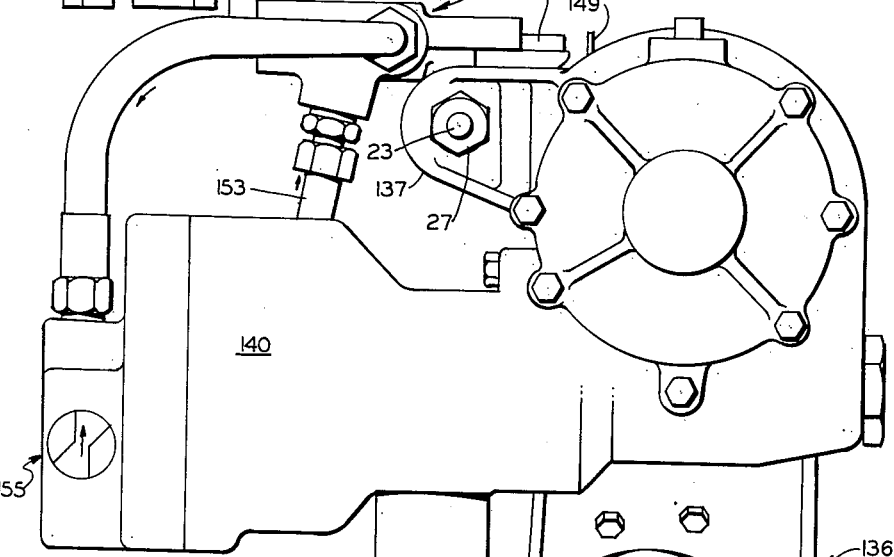
FIG_13
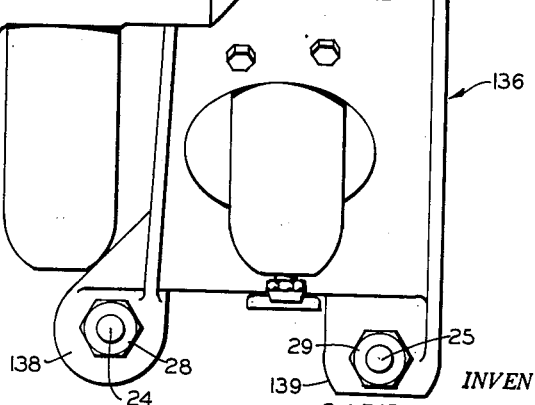
INVENTOR.
CARTER H. ARNOLD
BY
Boyken, Mohler + Wood
ATTORNEYS 3,063,653
HOISTING DEVICE
Carter H. Arnold, 13 W. Summit Drive,
Redwood City, Calif.
Filed Dec. 29, 1958, Ser. No. 783,561
7 Claims. (Cl. 254—150)

This invention relates to an improved hoist which is particularly adapted for use in supporting scaffolds and the like and which is similar in some respects to my co-pending United States patent application Serial No. 621,662 filed November 13, 1956 now Patent No. 2,917,-279 and to United States Patent No. 2,742,261 issued April 17, 1956, and Patent No. 2,756,947 issued July 31, 1956. This application is a continuation in part of application Serial No. 621,662.

The above noted application and patents relate to hoisting devices of the type in which a rope is wound around a drum to provide a plurality of windings in side by side relation. The rope in such cases has one end loaded and the other end slack and the windings formed around the drum are intermediate said slack and loaded ends.

Inasmuch as such hoists are almost always used to support workmen, the most important requirement is that they be safe in operation. Furthermore, because of the danger involved it is essential that the hoist be protected against falling or failure regardless of how many mistakes in judgement are made by the operator.

The main object of the present invention is therefore the provision of a scaffold hoist that is fool proof in operation and which is protected against all forms of failure.

Another object of the invention is the provision of a scaffold hoist having a unique load brake which automatically holds the hoist on the rope whenever the hoist starts to fall, and which brake does not consume power during the normal lowering operation.

Still another object of the invention is the provision of a scaffold hoist having a novel tensioning device for preventing relative slipping between the hoist and the rope.

Another object of the invention is the provision of a tensioning device which prevents the operator from releasing the tension of the rope on the hoist while the hoist is in use.

Another object of the invention is the provision of a hoisting drum having means thereon to faciliate receiving a rope therearound.

Another object of the invention is the provision of a power attachment which may be readily installed on a hoist without disassembling the latter.

Other objects and advantages will be apparent from the following description and from the drawings:

FIG. 1 is a side elevation of the hoist.
FIG. 2 is a fragmentary cross sectional view as taken along lines 2—2 of FIG. 1.
FIG. 3 is a fragmentary cross sectional view as taken along lines 3—3 of FIG. 1.
FIG. 4 is a side elevation of the hoist from the side opposite FIG. 1.
FIG. 5 is a vertical cross section of the hoist with some portions thereof in elevation taken along line 5—5 of FIG. 4.
FIG. 6 is a top plan view of the hoist.
FIG. 7 is a top plan view of the hoist provided with an electric motor drive.
FIG. 8 is a schematic horizontal cross section of the hoist drum with portions broken away to illustrate the operation of the guide elements.
FIG. 9 is an exploded view of the hoist.
FIG. 10 is a side elevation, partly in section, of the electric power attachment.
FIG. 11 is a side elevation, partly in section, of the air power attachment.
FIG. 12 is a top plan view of the air power attachment.
FIG. 13 is a front elevation of the air power attachment.

In detail, and with reference to FIGS. 1, 4, 5 and 9 the hoist of the present invention comprises a housing formed by a pair of opposed side plates 1, 2 between which is received a drum 3 rotatably supported by means of a shaft 4 in bearings 5, 6 carried by plates 1, 2 respectively (FIG. 5). Drum 3 is secured to shaft 4 by key 7.

Shaft 4 extends past plate 1 and is provided with a relatively large gear 8 which in turn is driven by a pinion gear 9 secured to a shaft 10. The shaft 10 extends through the side plates 1, 2 and is rotatably mounted in bearings 11, 12 carried by side plates 1, 2 respectively.

Pinion shaft 10 extends past side plate 2 and is threaded at its end as at 14 to receive thereon a complementarily threaded driving element 15. In the hoist shown in FIGS. 1, 9 said element 15 is provided with a hand crank 16 secured to element 15 by bolts 17.

The shaft 10 is provided, adjacent side plate 2, with an annular radially outwardly extending flange 19 which serves as a backing plate for a disk brake assembly generally designated 20. This brake 20 will be described in greater detail later on but at this point it may be noted that shaft 10 is driven through said brake by driving element 15 which, when rotated in a clockwise direction (FIG. 1), urges the brake unit 20 against backing plate 19. Such rotation of driving element 15 rotates gear 8 in a counterclockwise direction as seen in FIG. 4 together with drum 3.

The side plates 1, 2 are spaced apart by means of tubular spacers such as spacer 21 in FIGS. 5, 9 and four bolts 22, 23, 24 and 25 and nuts 26, 27, 28 and 29 respectively are employed adjacent the four corners of the side plates 1, 2 to hold said side plates relative to each other.

In order to provide a guard for the pinion 9 and gear 8, side plate 1 is provided with a peripherally extending flange 31 to which is secured a cover plate 32 by means of screws 33.

As best seen in FIGS. 5, 6 the drum 3 is provided with a plurality of axially spaced parallel grooves for receiving therein the windings of a rope generally designated 35. In the example shown in the drawings the rope 35 has an upper loaded end 36 from which the hoist is suspended (FIG. 5) and a lower unloaded or slack end 37 which hangs downwardly from the hoist. Intermediate said loaded and slack ends the rope 35 is wound around said drum 3 so that the major portions of the circumferential extent of said windings are received in the grooves. As best seen in FIG. 6 five such grooves are shown numbered 40, 41, 42, 43, 44, however, it will be understood that the number of grooves is not critical although it has been found that five grooves work satisfactorily with the 6" diameter drum employing a 5/16" dia., 6 x 37 wire rope shown in the drawings.

Groove 40 on drum 3 is adjacent side plate 1 and receives the first winding of the rope 35 from the upper loaded end 36 of the latter. A guide member generally designated 46 (FIG. 9) is provided between side plates 1, 2 and is secured thereto by screws 47, 48 respectively (FIG. 9). Said guide 46 follows generally the periphery of drum 3 along the upper side of the latter and is provided with a plurality of rope guide elements which project radially downwardly relative to the drum 3. The purpose of said guide elements is to shunt the windings of the rope from one groove to the adjacent groove and said guide elements are designated 50, 51, 52, 53 and 54 in FIGS. 8 and 9.

As best seen in the schematic arrangement shown in FIG. 8 the upper loaded end 36 of the rope 35 enters groove 40 of drum 3 and almost completely encircles said groove 40 before it engages guide element 50 adjacent the tangent point of rope end 36. Guide element 50 is slantingly disposed relative to the plane of winding 56 that is received in groove 40 so as to deflect said winding into the adjacent groove 41 of drum 3. In this manner winding 57 in groove 41 becomes a continuation of winding 56 and so on. From FIG. 8 it will be apparent that the remaining windings 58, 59 are shunted from grooves 42, 43 by means of guide elements 52, 53 respectively into grooves 43, 44.

It will be noted that guide element 54 performs no function in FIG. 8. This is because the arrangement of windings shown in FIG. 8 occurs when the hoist is being driven up the loaded end 36. Upon reversing the direction of the hoist guide element 50 becomes inoperative and guide element 54 then serves to deflect winding 60 from groove 44 into groove 43. In other words, both sides of guides 51, 52, 53 are employed to guide the rope windings although only one side is employed when the hoist is being driven in one direction. Only one side of each guide 50, 54 is employed to guide the rope.

The arrangement and shape of guide elements 50–54 is extremely important. It will be noted that said elements are spaced circumferentially as well as axially. By this arrangement the grooves on drum 3 may be made close together to economize on space and thus hold the width of drum 3 to a minimum. If the elements 50–54 were arranged in an axially extending row the grooves would have to be spaced apart a greater distance than that shown in order to accommodate the guide elements therebetween.

It should also be noted at this point that the guide elements 50–54 are elongated in the direction in which the rope is shunted in order to provide a relatively long line of contact between said guides and the rope. Not only does this reduce wear on the guides but it also prevents a breakdown of the wire by avoiding sharp changes in direction of said wire.

The guide elements 50–54 are, of course, positioned as closely as possible to the drum in a radial direction so as to engage the rope at its widest portion. Also it will be noted that the peripherally extending ridges between adjacent grooves are rounded to a radius so that the junctures between adjacent windings are not subject to sharp changes in direction. In addition, said grooves are undercut along their central portions to effect a wedging action between rope and groove and to allow for wear in the drum.

The upper loaded end 36 of rope 35 is guided to drum 3 by means of an eye 65 provided with a downwardly extending flange 66 which is apertured to receive therethrough bolt 23 which secures the side plates 1, 2 together. The guide opening 67 in eye 65 is of course in alignment with the vertical tangent to groove 40 for vertically positioning the hoist relative to the vertical loaded run 36 of the wire from which it is suspended.

Housing bolt 23 also passes through an opening in a horizontally extending plate 69, and a spacer 70 serves to space said plate 69 and eye 65 away from side plate 2 of the housing and thus in turn space side plates 1, 2 the desired distance from each other. Plate 69 is apertured at its opposite end to receive therethrough a shaft 71 extending between and received in complementarily formed apertures in side plates 1, 2. Bushings 72, 73 are press fitted in said openings in side plates 1, 2 to serve as bearings for said shaft 71.

Secured to shaft 71 by means of pin 75 is a safety lever generally designated 76 which is provided with a relatively heavy handle 77 causing shaft 71 to be urged counterclockwise (FIG. 4) by gravity. On the side of shaft 71 opposite handle 77, lever 76 is provided with an arcuate cam portion 78 which is formed with a groove 79 complementary in cross section to the cross section of rope 35. Similarly, the vertically extending flange 66 of eye 65 is also formed complementary to rope 35 so that the loaded run 36 of said rope is clamped between safety lever 76 and flange 66 when the lever 76 is urged in a counterclockwise direction by its own weight. In other words, assuming the tension in the rope were not taken by the drum 3 the hoist would still be supported on the upper end 36 of the rope because the latter is clamped by said safety lever. However, if it is desired to run the hoist either up or down it is merely necessary to swing the handle 77 of lever 76 upwardly to release the clamping portion from the rope. In other words the arcuate portion 78 of lever 76 which contains the groove 79 is formed so that downward motion of the hoist is prevented but upward motion is not. This general type of positive stop is old in the rigging art and no claim is made to the same except in combination with the remainder of the hoist.

As an additional safety feature a torsion spring 82 is mounted on shaft 71 and one end 83 is bent around handle 77 and the other end 84 is held against spacer 70 on bolt 23. Said spring thereby exerts a positive downward load on handle 77 to positively clamp the rope at all times. If the spring 82 breaks, the weight of handle 77 is sufficient to exert sufficient clamping load (FIG. 6).

A bushing 86 is interposed between plate 69 and side plate 2 on shaft 71 so as to hold safety lever 76 in its proper relationship relative to eye 65. It will be noted that plate 69 serves to retain the rope 35 against lateral movement relative to the safety lever and also connects shaft 71 with the heavy housing bolt 23 to provide adequate resistance for the reaction caused by the clamping forces.

Another safety feature of the hoist is the provision of a dog 88 swingably mounted on shaft 89 extending between side plates 1, 2. The dog 88 is adapted to enter one of the spaces between the teeth on bull gear 8 so as to prevent rotation of the latter in the lowering direction. In other words the drum 3 cannot rotate counterclockwise (FIG. 4) while dog 88 is engaged. To retract dog 88 out of engagement with bull gear 8, a tightly wound helical spring 91 is secured at one end by means of screw 92 to the adjacent end of shaft 71 on which safety lever 76 is mounted. This spring 91 is adapted to engage an upwardly projecting extension 90 on dog 88 so as to swing said dog in a counterclockwise direction (FIG. 4) when safety lever 76 is swung upwardly to release it from rope 35. By this structure when it is desired to operate the hoist it is merely necessary for the operator to first swing the lever 76 upward and thereby release both safety devices: the clamp 78 and the dog 88.

Another device to promote safety and also the efficiency of the hoist is a tensioning device generally designated 94 (FIG. 1) which acts to press the last winding 60 (FIG. 8) against the drum 3 at all times. It will be understood in this connection that proper performance of the hoist depends upon all the rope windings being in tight engagement with the drum 3 and particularly the last winding 60 adjacent the slack end 37. If slack develops in the last winding 60 it is obvious that such slack will be transferred to the adjacent windings and thus permit the rope 35 to slip relative to the drum 3.

To forceably urge the last winding 60 against the drum preferably three rollers 95, 96 and 97 are applied against said winding at spaced points along the periphery of the drum adjacent the slack end 37. Each roller 95–97 is rotatably mounted in a clevis 98 (FIG. 9) which in turn is pivotally supported on a block 99 secured to side plate 2 of the housing by means of screws 101. A strong compression spring 100 is interposed between each clevis 98 (FIG. 1) and the block 99 so that each roller engaging the rope 35 is yieldably urged radially inwardly of the drum 3 at all times.

Block 99 is provided with a recess 104 (FIG. 9) for receiving therethrough the housing bolt 24 and a tubular spacer 105 is mounted on said bolt 24 to space the block 99 from side plate 1. This in turn positions the rollers 95–97 in the same plane as the last winding 60 which it engages. To maintain the slack end 37 of the rope in the proper plane relative to rollers 95–97 a U-shaped member or guide 107 is positioned adjacent the last roller 97 so that the rope is retained between the sides of said guide (FIG. 2). Guide 107 is apertured to receive housing bolt 25 therethrough and a tubular spacer 108 (FIG. 2) is mounted on bolt 25 to retain the guide in its proper position relative to side plate 2. An additional spacer 109 is interposed between the sides of guide 107 on bolt 25 to resist the compression on side plates 1, 2 set up by the tightening of bolt 25. To facilitate the movement of the slack end 37 of the rope a bushing 110 is rotatably supported on spacer 109.

Also supported on the housing bolts 24, 25 which resist in positioning the tensioning device 94 is the scaffold support generally designated 112 or whatever other apparatus is handled by the hoist (for example, a bosun's chair). To prevent the scaffold support from shifting toward sideplate 2 the spacer 105 on bolt 24 is preferably reduced in diameter as at 113 (FIG. 9) for snugly receiving thereon the apertured upper portion of the scaffold support. By this structure the scaffold support is positively positioned in the same vertical plane as the first winding 56 and the loaded end 36 of the rope 35.

Referring again to the tensioning rollers 95, 96, 97 it will be understood that springs 100 are relatively strong so as to insure tight engagement with the rope over the arc on which the rollers operate. Since this is the case it is impossible for the operator to reeve the rope 35 between the drum 3 and all three rollers 95, 96 and 97 by pushing on the slack end of the rope. Furthermore, it is undesirable to provide means for releasing the rollers from the positions shown in FIG. 1 because such means might possibly be actuated inadvertently by the operator while the hoist is suspended with the operator on it.

In order to retain the compression on rollers 95, 96 and 97 at all times and at the same time permit the rope 35 to be readily applied to the drum 3 in the manner shown in FIG. 8 there is provided a slot 114 on the drum 3 (FIGS. 1, 9) encompassing the groove 40. Slot 114 is slantingly disposed relative to the radius of the drum 3 so as to receive therein the end portion of the slack end 37 of the rope 35.

Referring to FIGS. 1, 8 the rope is first wound around groove 44 and then groove 43 and so on in the manner shown in FIG. 8 until the last groove 40 has been partially encircled by the rope. The end 115 of rope 35 is then bent back to the dot-dash position of FIG. 1 and inserted into slot 114 on the drum, the latter of course being hollow. The drum 3 is then rotated counterclockwise (FIG. 1) so that the rollers 95, 96, 97 roll up on the wire. After the slot 114 passes the last roller 97 and beyond side plate 2 the rope end 115 may then be removed from the slot 114 and passed between the sides of the U-shaped guide 107.

By the above described structure of the tensioning device it is impossible for the tension on the rope to be removed while the hoist is in use and it is therefore necessary to bring the hoist to an inoperative safe position before the rope can be removed from between the drum and the tensioning rollers.

Another safety feature of the hoist resides in the construction and operation of the brake 20 which is interposed between the driving element 15 and the driving shaft 10. As stated before, the shaft 10 is provided with a radially outwardly extending flange 19 which provides a backing plate for the brake assembly 20.

In detail, the brake comprises a radial brake disk 120 (FIG. 5) provided with a peripherally extending flange 121 which rotatably supports the brake disk 120 on both the flange 19 of shaft 10 and the outer periphery of the driving element 15. Interposed between disk 120 and the backing plate flange 19 is an annular friction disk 122, and a similar friction disk 123 is interposed between brake disk 120 and driving element 15.

At this point it may be noted that upon rotation of the driving element 15 in a clockwise direction (FIG. 1), said element shifts axially along shaft 10 because of the threaded connection 14 between said element and shaft 10. Friction disks 122, 123 and brake disk 120 are thus clamped between said driving element 15 and the backing plate 19 so that the shaft 10 is rotated in the same direction as driving element 15. If it is supposed that the direction of rotation of driving element 15 is then reversed so as to reverse the direction of the hoist, the load on drum 3, acting through bull gear 8, pinion gear 9 and shaft 10, retains the braking elements in the same clamped position thus transferring the load to driving element 15.

By the present invention the flange 121 of brake disk 120 is provided with a peripherally extending ratchet 125 the teeth of which are adapted to be engaged by the detent portion 126 at the upper end of a pawl 127. Pawl 127 is pivotally supported on the same shaft 89 that supports dog 88 on the opposite side of the housing (FIG. 3). It will be apparent from FIG. 1 that pawl 127 can act to hold shaft 10 only when the latter is tending to turn in a counterclockwise direction (FIG. 1) and that said pawl is inoperative when the driving element 15 drives the shaft 10 in a clockwise direction.

Pawl 127 is weighted at its lower end as seen in FIG. 1 so as to urge detent 126 in a clockwise direction by gravity toward an engaging position with the ratchet 125 at all times. Supported on shaft 89 is a torsion spring 129, one end of which is held against a pin 131 (FIG. 3) on side plate 2 and the other end of which butts against a pin 132 received in one of the apertures 133 in pawl 127. As best seen in FIG. 1 the action of spring 129 thus urges pawl 127 in a counterclockwise direction so that detent 126 is urged away from engagement with the ratchet 125 against the force of gravity acting on the loaded lower end of pawl 127.

The lower end of pawl 127 is formed to provide a follower portion 135 including a shoulder 136 that is adapted to engage, but not to lock with, the teeth of ratchet 125. By this structure rotation of the driving element 15 (such as by means of crank 16) in a counterclockwise direction (assuming detent 126 to be released) results in the ratchet 125 alternately swinging the lower weighted portion 135 of the pawl 127 outwardly against the urgency of spring 129. The relationship of detent 126 and the follower portion 135, including shoulder 136, is predetermined so that said follower follows closely the contour of the ratchet and detent 126 is not swung inwardly a sufficient amount to engage ratchet 125 for stopping shaft 10. Such a situation occurs when the driving element is rotating in a counterclockwise direction at a relatively slow speed to lower the hoist in the example shown in the drawings.

However, if it is assumed that the hoist is moving downwardly at a relatively high speed such as might occur if the crank 16 were inadvertently released, the "kick" imposed on follower 135 of pawl 127 is sufficient, due to the inertia of the latter, to overcome the force of spring 129 and thereby swing detent 126 into engagement with the ratchet 125. The effect of this is, of course, to hold the brake disk 120 stationary relative to the housing so that brake 20 is engaged to arrest further downward movement. It will be understood that in the usual operation at normal speeds the brake 20 does not function insofar as friction in the brake elements is concerned and no power is lost by "working against the brake" as in prior art load brakes of like nature.

It will be apparent that brake 20 is a true "load brake" in that the load is acting on the brake elements at all times. However, no friction is created by relative movement of the brake elements except in an emergency situation when the speed of the shaft exceeds a predetermined amount as determined by the force of spring 129.

The maximum safe speed of the hoist will of course depend on whether the hoist is manually actuated or driven by power means such as will be described. For this and other reasons it is desirable to be able to adjust the spring tension in spring 129 and to this end a row of holes 133 is provided for receiving pin 132 therein. This gives a positive means for predetermining the speed at which detent 126 will engage the ratchet 125 (FIG. 1).

Aside from the fact that no power is wasted in driving brake 20 the most important feature of the brake from a safety standpoint is that it "fails safe," that is, if spring 129 fails, the detent 126 is swung into ratchet engaging position because of the weighted end 135 of the pawl 127. Other types of escapement actuated brakes that are in balance "fail unsafe" and therefore do not provide safety when needed.

The invention contemplates the use of either manual drive by means of hand crank 16 or power means such as an electric motor or air motor.

One of the advantages of the present invention is that power means may be employed to run the hoist, and any scaffolding attached thereto, up the side of a building, for example, to the approximate position where work is to be done by the operator, and then the power means may be removed and replaced by a hand crank 16 for use in shifting the scaffolding relatively short distances during the performance of the work such as sand blasting, painting and the like. Also, in case of power failure, or in any other like emergency, when power means is being employed to run the hoist it is a simple matter to change over to hand operation. For this purpose the hoist is specially adapted to be held in a fixed position while the crank 16 is replaced by a power means and vice versa.

FIGS. 11, 12, 13 illustrate an air motor power means and FIGS. 7, 10 illustrate an electric motor power means, both of which power means are reversible.

Referring to FIGS. 11, 12, 13 the air motor power unit comprises a housing generally designated 136 (FIG. 13) which is provided with three bolting pads 137, 138, 139 apertured to receive housing bolts 23, 24, 25 respectively. It will be noted that no means is provided for receiving housing bolt 22. The reason for this is that said housing bolt 22 is employed to hold the sides of the housing together while the hand crank 16 is being replaced by the air motor power unit or vice versa.

The air power unit comprises an air motor 140 the output shaft 141 of which is provided with a worm 142 (FIG. 11) which is in mesh with a worm wheel 143 mounted on a shaft 144. This shaft 144 is provided with a driving dog 145 formed complementarily to the driving element 15 so as to receive the latter therein; the hand crank 16 having been removed by removing screws 17 (FIG. 9).

When it is desired to substitute the air motor power unit of FIGS. 11, 12, 13 for the hand crank 16 (FIG. 9) it is merely necessary to remove nuts 27, 28, 29 from housing bolts 23, 24, 25 respectively and pass said bolts through the holes in bolting pads 137, 138, 139 respectively. Nuts 27, 28, 29 may then be secured to said bolts to hold the power unit in its proper fixed position relative to the hoist.

It is of course important that the axis of shaft 144 (FIG. 11), which carries driving dogs 145, be in exact axial alignment with the axis of pinion shaft 10 (FIG. 5) which carries driving element 15. If such alignment is achieved vibration is eliminated. In order to insure such alignment of shafts 10 and 144, the bolt holes 147 in pads 137, 138, 139 of the housing are countersunk to receive the complementarily formed frusto conical ends 145 of the nuts 27–29. By machining the bolt holes 147 with reference to the axis of shafts 10 and 144 the power unit is thus shifted automatically to its proper position relative to the axis of pinion shaft by virtue of the automatic centering of the nuts on the housing bolts.

When the crank 16 is employed without the power unit the nuts are of course reversed so that the flat ends engage the side plate (FIG. 9).

Since the power unit may thus be substituted for the hand crank in the manner described in a matter of minutes it will be apparent that a contractor employing, say ten hoists, for five scaffolds, need only employ two power units. After the scaffold is brought to the approximate position where the work is to be performed by the power units, the later may be removed and the hand cranks substituted.

If the hoist is to be employed with a power unit the end of shaft 71 which carries the safety lever 76 is provided with an upwardly extending arm 149 (FIG. 12) which, upon upward swinging of said lever is adapted to depress a valve pin 151. Valve pin 151 opens an air valve generally designated 152 which is interposed in the air supply line 153 leading to the air motor 140.

In addition to said valve 152 is the usual "on-off" and reversing valve 155 adjacent the air motor 140. By providing the valve 152 in series with the usual valve 155 the air motor 140 cannot be actuated until the safety lever 76 is raised just as in the case of the manual operation. During power operation the operator thus need only use one hand to operate the hoist and the other hand is left free.

The electric motor power unit of FIGS. 7, 10 is somewhat similar to the air unit in that three bolts are employed to secure it to the housing. Said electric unit comprises, generally, an electric motor 157 the output shaft of which is connected by means of a timing belt 158 with a vertically disposed worm shaft 159 which in turn drives a worm wheel 160 carried on the output shaft 161. This shaft 161 is provided with a driving dog 162 (FIG. 10) which is the same in all respects as driving dog 145 carried by the air unit (FIG. 11).

The switch arm 149 on the safety lever shaft 71 also serves to actuate a switch 164 in the electric motor power supply line so as to prevent actuation of the power means when the safety lever 76 is in engagement with the loaded end of the rope. The electric motor 157 is, of course, reversible.

The above described invention has been found to be extremely efficient in operation and to be safe against almost all hazards with the exception of the rope breaking.

With respect to the tensioning device 94 it has been found that the provision of three rollers spaced along a relatively large arc of the last rope winding 60 obviates any slippage between drum and rope. It should be noted in this connection that the use of only one roller, even though the pressure thereon is three times as great as the pressure on each of the three rollers herein shown, does not result in the high degree of tensioning obtainable by a plurality of rollers spaced around an arc.

With respect to safety lever 76 it should be emphasized that the same must be held in a raised position at all times by the operator. If the operator releases said lever for any reason the hoist is stopped by actuation of two separate devices, that is, dog 88 acting on bull gear 8 and the clamping action of the arcuate portion 78 of the safety lever 76.

The detailed description herein made of the invention is not to be taken as restrictive of the same as it is obvious that various modifications may be resorted to without departing from the spirit of the invention as defined in the following claims.

I claim:

1. In a drum adapted to receive a rope winding around the peripheral surface of said drum at a point along the axial extent of said drum; means for preventing axial shifting of said winding from said point; a roller mounted for rotation at said point and spring pressed radially inwardly of said drum for forceably pressing said winding against said drum, a radial extending opening in said drum at said point to permit an end of said rope to be received therethrough, whereby said end of rope may be inserted into said opening and said drum rotated past said roller with the latter rolling up on the rope at said end.

2. In a hoisting device: a housing, a drum rotatably supported in said housing and adapted to receive a rope winding around the peripheral surface of said drum at a point along the axial extent of said drum, means for preventing axial shifting of said winding from said point, a roller rotatably mounted on said housing at said point and adapted to engage said winding for pressing the latter between said roller and said drum, a spring for forceably urging said roller radially inwardly of said drum at all times, said drum being provided with an opening at said point for receiving an end of said rope therethrough whereby said drum may be rotated past said roller with said end received through said opening.

3. A hoisting device for handling a rope having a loaded end and a slack end comprising: a housing, a drum rotatably supported on said housing and provided with a plurality of circumferentially extending parallel grooves in planes at right angles to the axis of said drum, said rope being wound around said drum intermediate said ends to provide a plurality of windings respectively received in said grooves with the connecting junctures of adjacent windings in engagement with said drum between said grooves guide means carried by said housing and in engagement with said rope at said junctures for guiding said rope from one winding to the adjacent winding in engagement with the periphery of said drum, said guide means comprising elements fixedly secured relative to said housing and extending toward said drum.

4. A hoisting device for handling a rope having a loaded run and an unloaded run comprising: a housing, a drum rotatably supported on said housing and provided with a pair of circumferentially extending parallel grooves in planes at right angles to the axis of said drum, said rope being wrapped around said drum intermediate said grooves to provide a pair of windings respectively received in said grooves with the connecting juncture between said windings in engagement with said drum between said grooves, a guide carried by said housing and engaging said rope at said juncture for guiding said rope from one groove to the other in engagement with the periphery of said drum, said guide being positioned adjacent the point of engagement of said loaded run with said drum.

5. In combination with a length of rope, a hoisting device comprising: a housing, a rotatable drum mounted on said housing, a plurality of windings formed intermediate the ends of said length and wound around said drum in side by side relation, the opposite end portions of said length being free from said drum and one end portion being adapted to be wound onto said drum upon rotation of the latter as the opposite end portion is wound off, whereby the number and extent of said windings remain the same, means for holding said windings against axial movement during rotation of said drum and means carried by said housing for deflecting said rope from one of said windings to an adjacent winding during said rotation with the deflected portion of said rope in engagement with the periphery of said drum, said holding means comprising a plurality of peripherally extending axially spaced parallel grooves formed on said drum and adapted to receive said windings therein.

6. In combination with a length of rope, a hoisting device comprising: a housing, a rotatable drum mounted on said housing, a plurality of windings formed intermediate the ends of said length and a plurality of axially spaced grooves formed in the periphery of said drum for respectively receiving said windings therein, the opposite end portions of said length being free from said drum and one end portion being adapted to be wound onto said drum upon rotation of the latter as the opposite end portion is wound off, whereby the number and extent of said windings remain the same during said rotation, a plurality of deflector elements carried by said housing and adapted to engage corresponding windings for shunting said windings from one groove to the adjacent groove during said rotation with the shunted portions of said windings in engagement with the periphery of said drum, said elements being spaced apart circumferentially of said drum to permit said windings to be arranged in closely adjacent relationship.

7. A hoisting device adapted to be employed with a length of rope comprising: a housing, a rotatable drum mounted on said housing, a pair of windings of said rope on said drum and in engagement with the latter throughout their length with the major portions of said windings lying in parallel paths substantially at right angles to the axis of said drum and with the connecting juncture of said pair of windings slantingly disposed relative to said paths, means for holding said portions in said paths against axial movement relative to said drum, during rotation of the latter, and means carried by said housing and engaging said rope at said juncture for deflecting said rope from one path to the other, said holding means comprising parallel circumferentially extending grooves formed in the periphery of said drum and receiving said portions therein, said deflecting means comprising a pair of elements adapted to engage said pair of windings respectively for deflecting each of said windings to the adjacent groove with the deflected portions of said windings in engagement with the periphery of said drum, said elements being spaced apart circumferentially of said drum to permit said windings to be arranged in closely adjacent relationship.

References Cited in the file of this patent
UNITED STATES PATENTS

| | | |
|---|---|---|
| 1,437,987 | Miller | Dec. 5, 1922 |
| 1,461,052 | Simpson | July 10, 1923 |
| 2,533,592 | Landon | Dec. 12, 1950 |
| 2,564,499 | Ott | Aug. 14, 1951 |
| 2,584,099 | Harkrader | Jan. 29, 1952 |
| 2,614,433 | Cuckler | Oct. 21, 1952 |
| 2,622,706 | Turner | Dec. 23, 1952 |
| 2,625,373 | Hunt | Jan. 13, 1953 |
| 2,662,733 | Allenbaugh | Dec. 15, 1953 |
| 2,662,734 | Allenbaugh | Dec. 15, 1953 |
| 2,742,261 | Arnold | Apr. 17, 1956 |
| 2,748,604 | Nemec | June 5, 1956 |
| 2,802,636 | Sanford | Aug. 13, 1957 |
| 2,922,623 | Simmons | Jan. 26, 1960 |
| 2,929,494 | Lombardy | Mar. 22, 1960 |